United States Patent
Huang et al.

(10) Patent No.: US 6,393,662 B1
(45) Date of Patent: May 28, 2002

(54) LUBRICATED HINGE DEVICE

(75) Inventors: Fang Chi Huang; Yung Hsiang Cheng; Chieh Lee, all of Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/510,579

(22) Filed: Feb. 22, 2000

(51) Int. Cl.[7] .............................................. E05C 17/64
(52) U.S. Cl. ........................................ 16/273; 403/300
(58) Field of Search ........................ 16/273, 334, 340, 16/342, 381; 403/300, 301, 302, 305, 345, 52, 82

(56) References Cited

U.S. PATENT DOCUMENTS

| | | | |
|---|---|---|---|
| 5,491,874 A | * 2/1996 | Lowry et al. | 16/342 |
| 5,632,066 A | * 5/1997 | Huong | 16/342 |
| 5,666,695 A | * 9/1997 | Jegers et al. | 16/381 |
| 5,724,859 A | * 3/1998 | Yamada | 16/342 |
| 5,774,939 A | * 7/1998 | Lu | 16/342 |
| 5,943,738 A | * 8/1999 | Karfiol | 16/342 |
| 6,085,388 A | * 7/2000 | Kaneko | 16/342 |
| 6,230,365 B1 | * 5/2001 | Lu | 16/342 |
| 6,249,426 B1 | * 6/2001 | O'Neal et al. | 16/334 |
| 6,256,836 B1 | * 7/2001 | Lin et al. | 16/340 |
| 6,256,838 B1 | * 7/2001 | Lu | 16/342 |

* cited by examiner

Primary Examiner—Lynne H. Browne
Assistant Examiner—Doug Hutton
(74) Attorney, Agent, or Firm—Wei Te Chung

(57) ABSTRACT

A hinge device comprises a male hinge member and a female hinge member. The male hinge member includes a pivoting rod at an end thereof, and a first mounting plate at an opposite end thereof, the first mounting plate being used for fixing the male hinge member onto a display unit of a portable computer. The female hinge member includes a body and a second mounting plate for fixing the female hinge member onto a mainframe unit of the portable computer. A first contacting section is defined on an outer periphery of the pivoting rod of the male hinge member. A second contacting section is defined on an inner periphery of the body for contacting with the first contacting section. A pair of grooves are defined in the second contacting section for retaining lubrication grease. The second mounting plate defines a receiving slot adjacent to the second contacting section for spacing the second contacting section from the second mounting plate to obtain a uniform torque resistance during rotation movements of the second contacting section in different directions.

12 Claims, 9 Drawing Sheets

1

LUBRICATED HINGE DEVICE

BACKGROUND OF THE INVENTION

The present invention relates to a hinge device, and particularly to a hinge device for pivotably connecting a display unit to a mainframe unit of a portable computer wherein the hinge device provides substantially a constant torque resistance at all positions in the arc of movement between various display unit open positions and the display unit closed position, and wherein the hinge device effectively retains lubrication grease therein so that the hinge device can have a smoother movement and a longer life.

A variety of hinge devices are used for rotatably coupling two articles together, such as a display unit and a mainframe unit of a portable computer. The display unit is required to be frequently opened or closed and to be positioned relative to the mainframe unit at any desired angle. However, the hinge device loses effectiveness after a period of use as it loses its ability to produce sufficient torque resistance to support the weight of the display unit. Such a conventional hinge device is disclosed in U.S. Pat. No. 5,574,252, as shown in FIG. 9. The hinge device comprises a pair of hinge members 10, an intermediate member 20 and a pair of helical springs 30. Each hinge member 10 has a cylindrical end 14. A blind hole 142 is coaxially defined in the cylindrical end 14 of a first hinge member 10, and an elongated boss 146 extends from the cylindrical end 14 of a second hinge member 10. The boss 146 extends through a through hole 246 defined in the intermediate member 20 and into the hole 142 of the cylindrical end 14, whereby the intermediate member 20 pivotally connects to the pair of hinge members.

No groove which can effectively reserve lubrication grease therein is defined in contact surfaces of the boss 146 and the intermediate member 20. The contact surfaces have a tendency to be damaged due to insufficient lubrication. Thus, the hinge device can not operate smoothly over a long lifespan. Furthermore, the hinge device provides different torque resistances at different positions in its operational arc during the closing and the opening of the display unit relative to the mainframe unit, resulting in a poor operational feel.

BRIEF SUMMARY OF THE INVENTION

A main object of the present invention is to provide a hinge device which pivotably joins a display unit to a mainframe unit of a portable computer and has means to retain lubrication grease therein, thereby producing a hinge which operates smoothly.

Another object of the present invention is to provide a hinge device for pivotably joining a display unit and a mainframe unit of a portable computer which has substantially a uniform torque resistance at different positions in its operational arc to keep the display unit at a desired angle relative to the mainframe unit when the display unit is rotated away from the mainframe unit.

A hinge device in accordance with the present invention comprises a male hinge member fixed to a display unit of a portable computer and a female hinge member fixed to a mainframe unit of the portable computer. The male hinge member includes a pivoting rod at one end thereof, a first mounting plate at an opposite end thereof for mounting the male hinge member onto the portable computer and a shoulder between the pivoting rod and the first mounting plate. The pivoting rod has a first contacting section on an outer periphery thereof. The female hinge member includes a cylindrical body for receiving the pivoting rod and a second mounting plate laterally extending from an end of the body for mounting the female hinge member onto the portable computer. A separating slot is transversely defined in a periphery of the body, thereby defining a receiving portion. A second contacting section is defined by an inner surface of the receiving portion for contacting the first contacting section, and a pair of sinuous grooves are defined therein for retaining the lubrication grease. A receiving slot is defined in the second mounting plate for spacing the second contacting section from the second mounting plate to maintain a uniform torque resistance during rotation movements of the second contacting section in different directions.

Other objects, advantages and novel features of the invention will become more apparent from the following detailed description when taken in conjunction with the accompanying drawings.

DETAILED DESCRIPTION OF THE INVENTION

Figure 1:
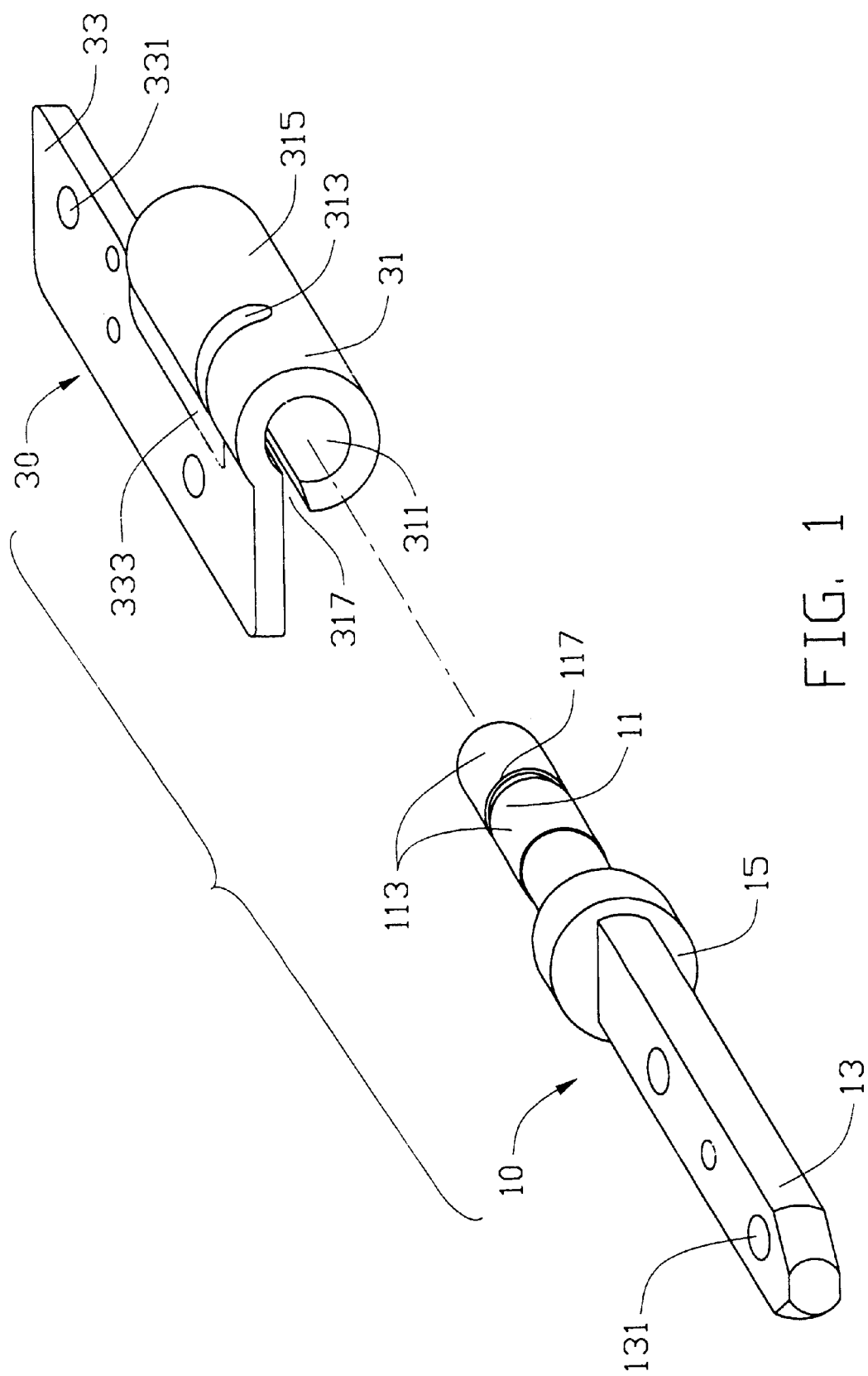
FIG. 1 is an exploded view of a hinge device in accordance with a first embodiment of the present invention.

Referring to FIG. 1, a hinge device according to a first embodiment of the present invention comprises a male hinge member 10 for fixing to a display unit of a portable computer (not shown) and a female hinge member 30 for fixing to a mainframe unit of the portable computer.

The male hinge member 10 includes a pivoting rod 11 at an end thereof, a first mounting plate 13 at an opposite end thereof and a shoulder 15 between the pivoting rod 11 and the first mounting plate 13. The shoulder 15 has a relatively large diameter compared to that of the pivoting rod 11 for abutting against the female hinge member 30 when the two members 10, 30 are connected together. The pivoting rod 11 has a first contacting section 113 on a rear portion of an outer periphery thereof. A recess 117 is intermediately defined in the first contacting section 113 for retaining lubrication grease therein. The first mounting plate 13 is substantially shaped with an elongated profile, and defines a plurality of mounting holes 131 for attaching the male hinge member 10 to the display unit of the portable computer by riveting or screwing, for example, which is well known to persons skilled in the art.

Figure 4:
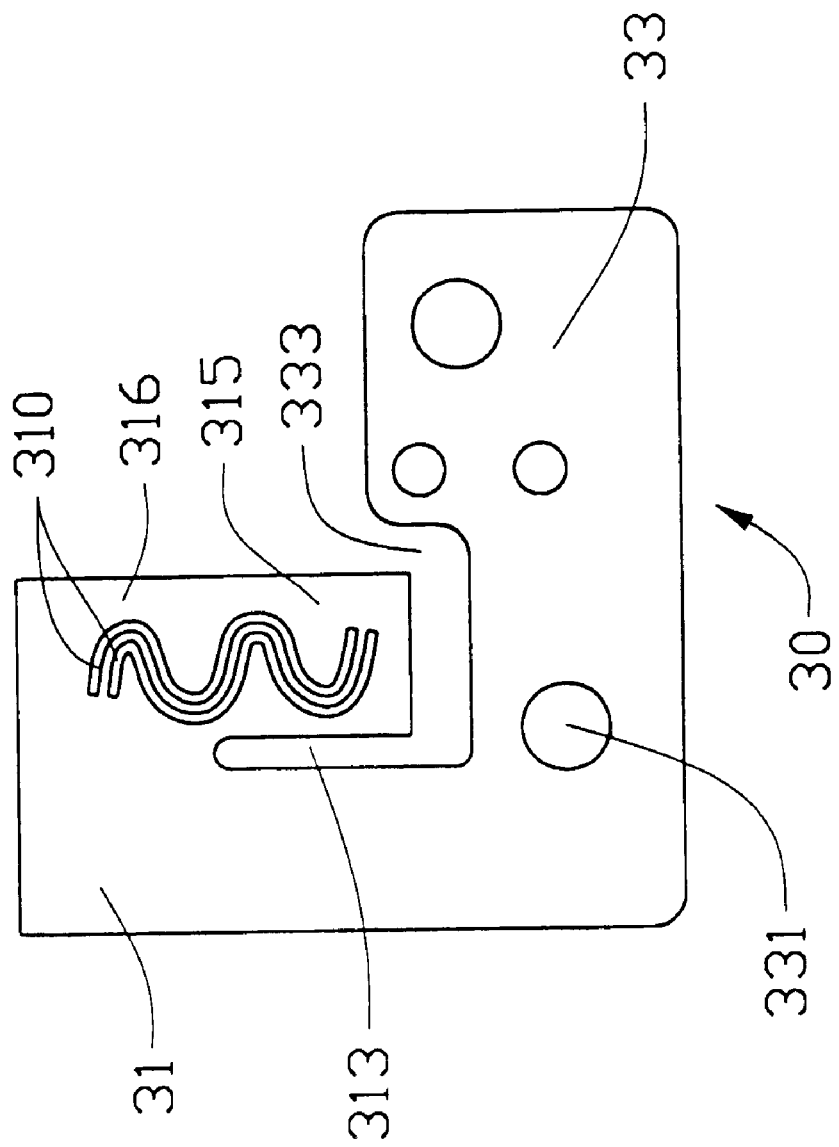
FIG. 4 is a bottom view of the female hinge member, wherein a body thereof is in an unrolled condition.

The female hinge member 30 comprises a cylindrical body 31 and a second mounting plate 33 laterally extending from a lateral edge of the body 31. A connecting opening 311 is longitudinally defined through the body 31 for receiving the pivoting rod 11 of the male hinge member 10 therein. The body 31 longitudinally defines a slit 317 adjacent to the second mounting plate 33 for enhancing the resiliency of the cylindrical body 31. A separating slot 313 is transversely defined in a part of the body 31, thereby defining a receiving portion 315. A second contacting section 316 (see FIG. 4) is defined by an inner surface of the receiving portion 315 for contacting the first contacting section 113 of the male hinge member 10. The second contacting section further forms a pair of sinuous grooves 310 therein for retaining lubrication grease. A receiving slot 333 is defined in an edge of the second mounting plate 33 adjacent to the body 31. The second mounting plate 33 is substantially rectangular, and a plurality of mounting holes 331 is defined in the second mounting plate 33 for attaching the female hinge member 30 onto the mainframe unit of the portable computer by riveting or screwing, for example.

Figure 2:
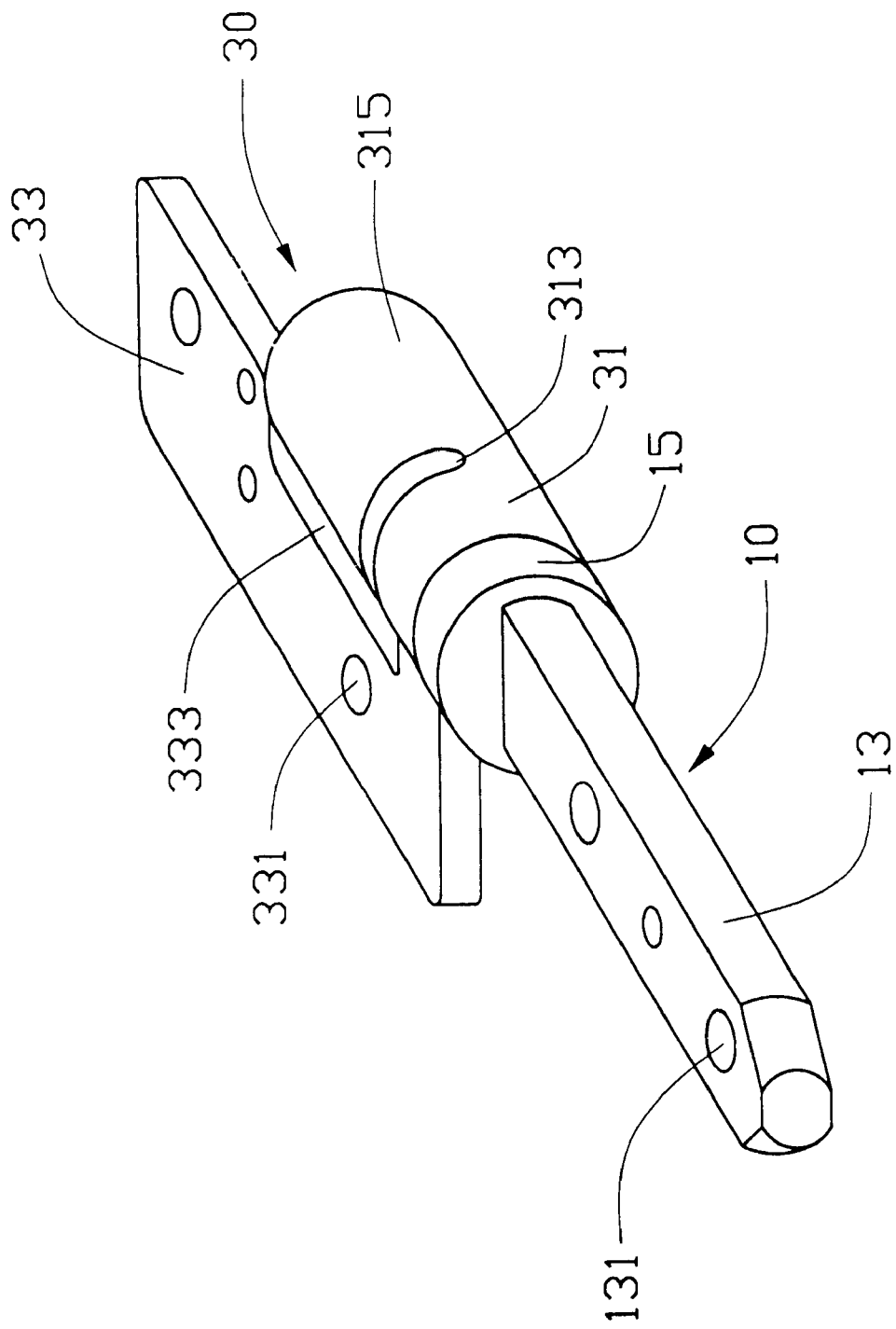
FIG. 2 is an assembled view of FIG. 1.
Figure 3:
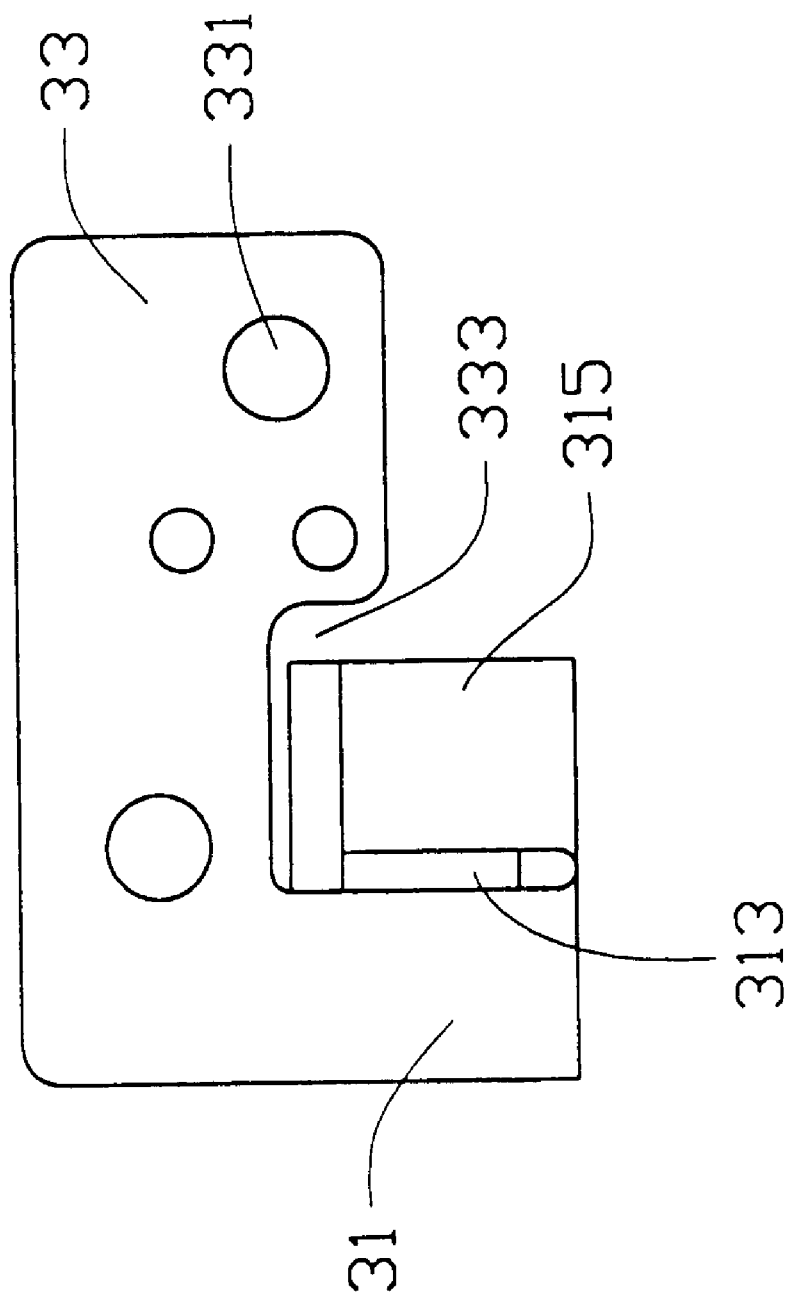
FIG. 3 is a top view of a female hinge member of the hinge device.

In assembly, referring to FIGS. 2 and 3, the pivoting rod 11 of the male hinge member 10 is fully inserted into the connecting opening 311 in the body 31 of the female hinge member 30 to a position where the shoulder 15 of the male hinge member 10 abuts against a front end of the body 31. At the assembled position, only the first contacting section 113 of the male hinge member 10 engages with the second contacting section 316 of the female hinge member 30. The contact area can maintain a smooth operation due to the grooves 310 retaining lubrication grease therein. Since the receiving slot 333 spaces the receiving portion 315 from the second mounting plate 33 and the receiving portion 315 is connected with the other portion of the body 31 via a small part of the body 31, the receiving portion 315 can be deemed to be an isolated part for cooperating with the pivoting rod 11 to generate the required torque resistance. Therefore, the torque resistance of the receiving portion 315 during a rotational movement is substantially the same in both the closing and the opening directions.

Figure 5:
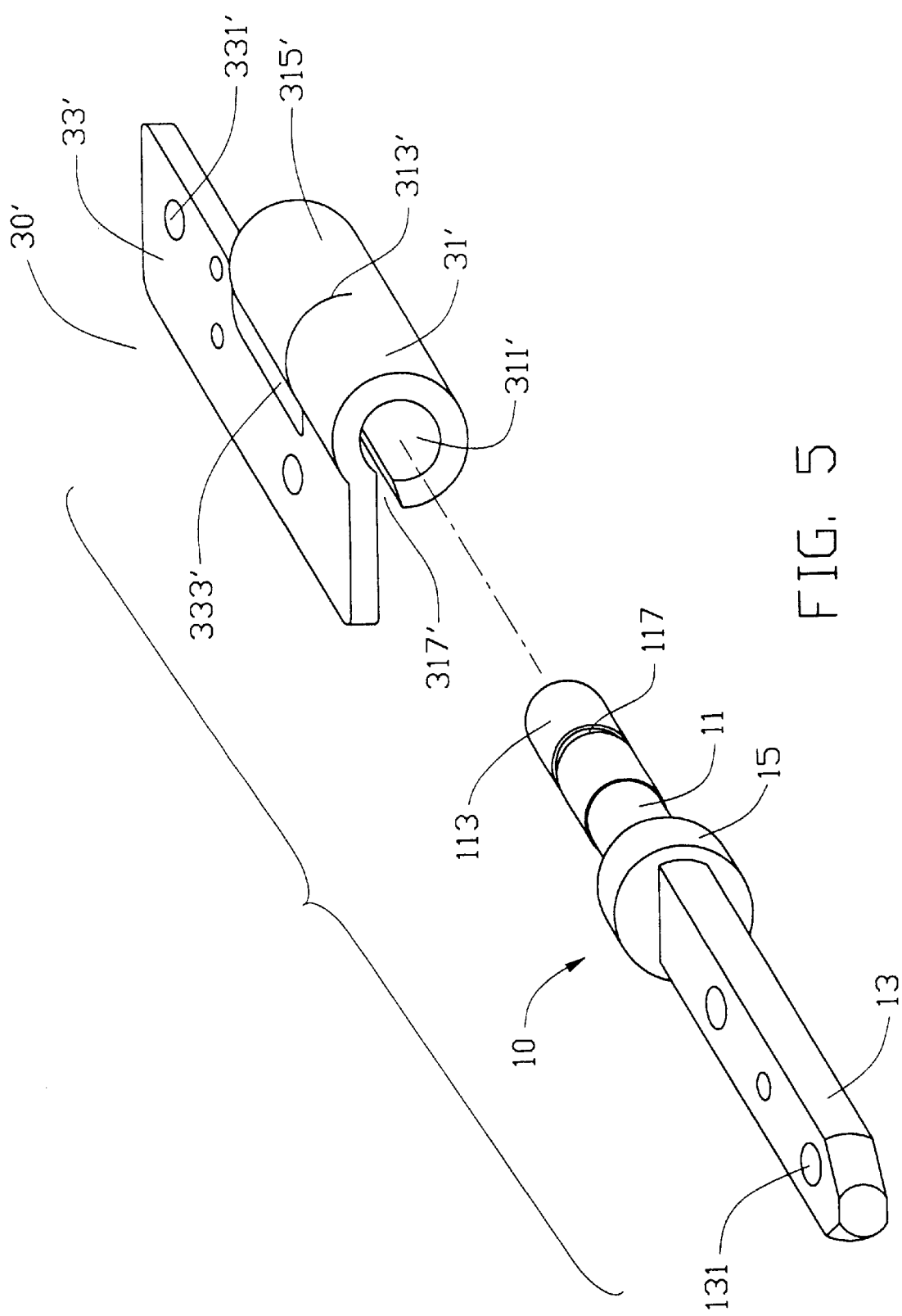
FIG. 5 is an explode view of a hinge device in accordance with a second embodiment of the present invention.
Figure 6:
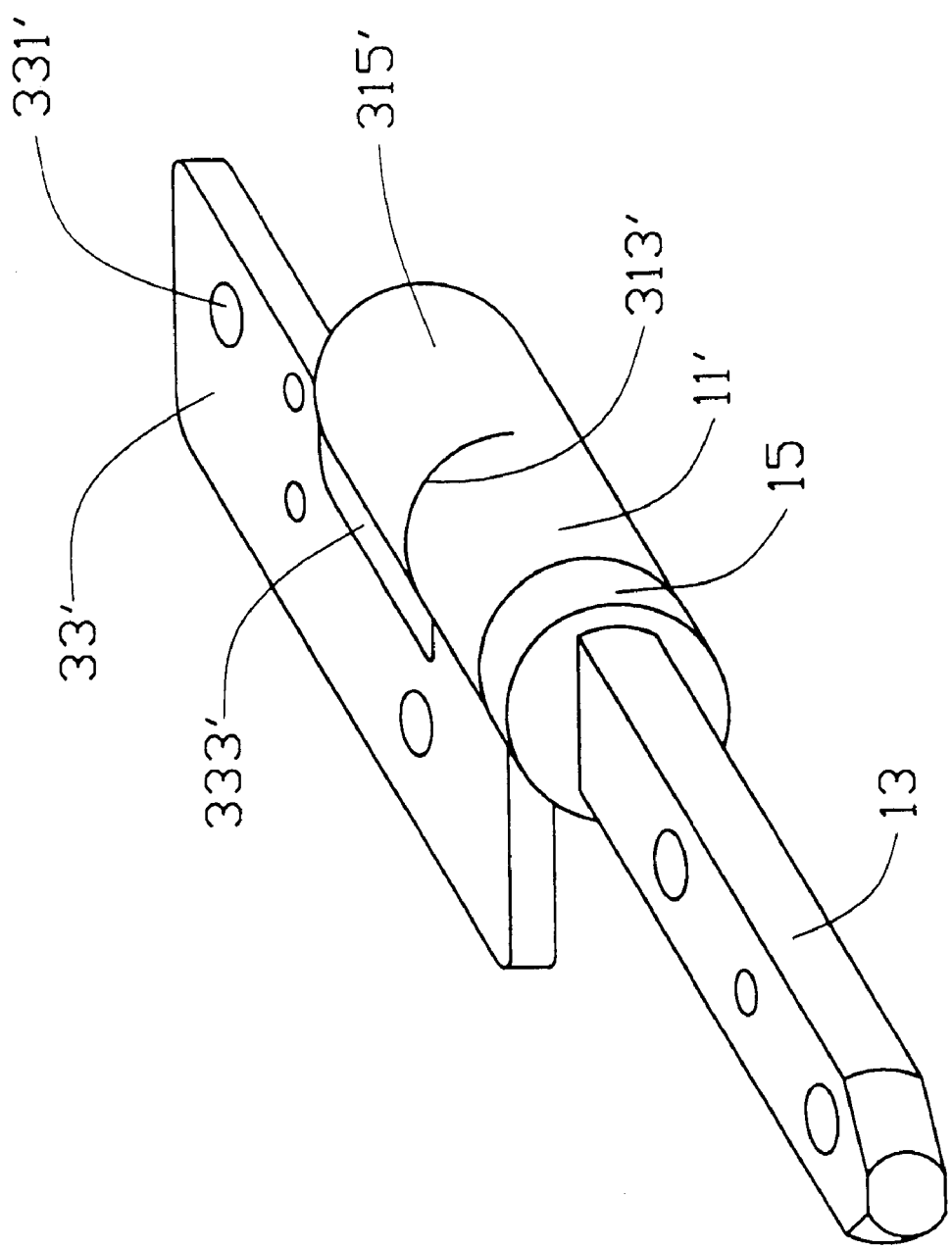
FIG. 6 is an assembled view of FIG. 5.

A hinge device in accordance with a second embodiment of the present invention is shown in FIGS. 5 and 6. The second embodiment is substantially identical to the first embodiment except that a relatively narrow split 313' is used to replace the separating slot 313 of the first embodiment.

Figure 7:
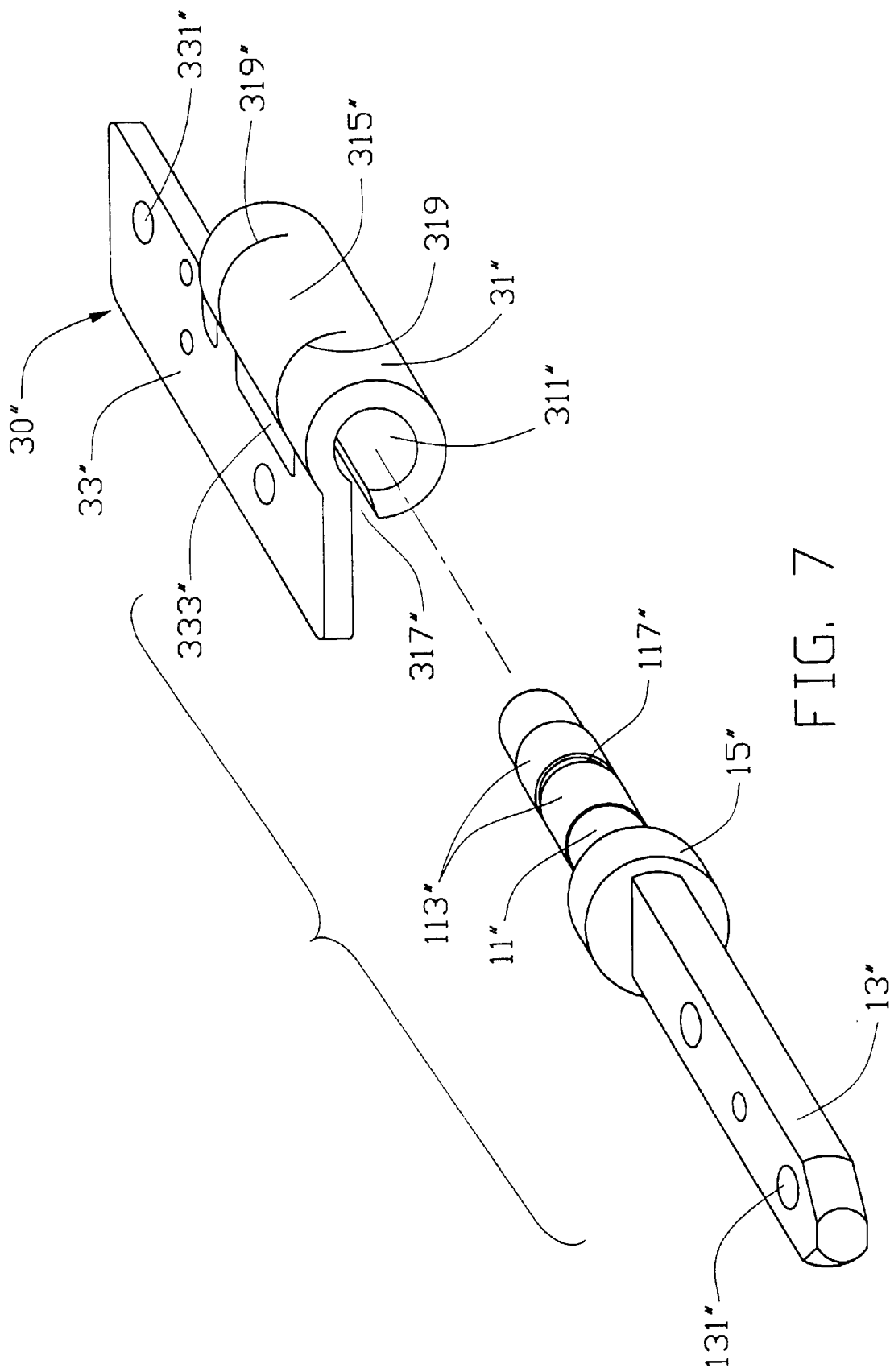
FIG. 7 is an exploded view of a hinge device in accordance with a third embodiment of the present invention.
Figure 8:
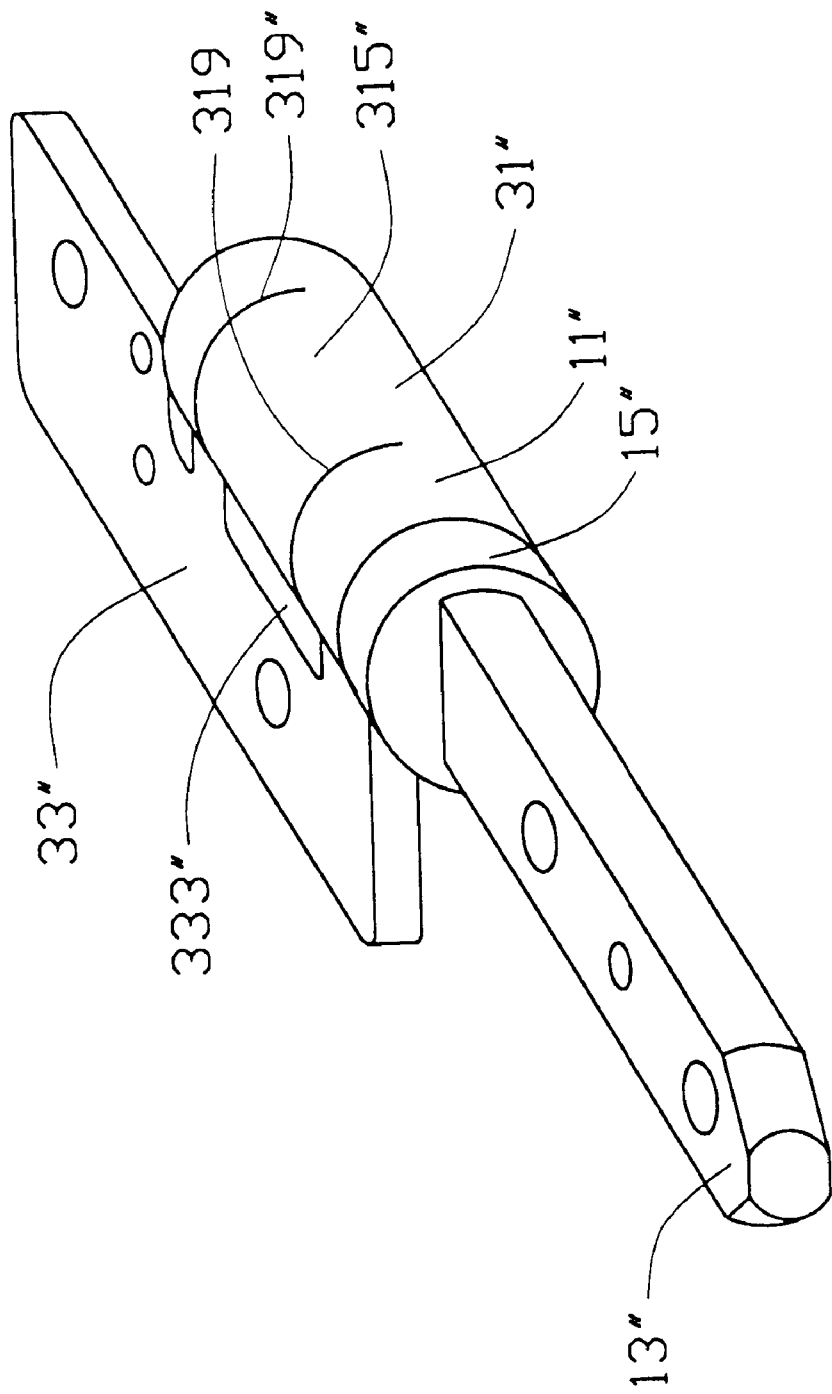
FIG. 8 is an assembled view of FIG. 7.
Figure 9:
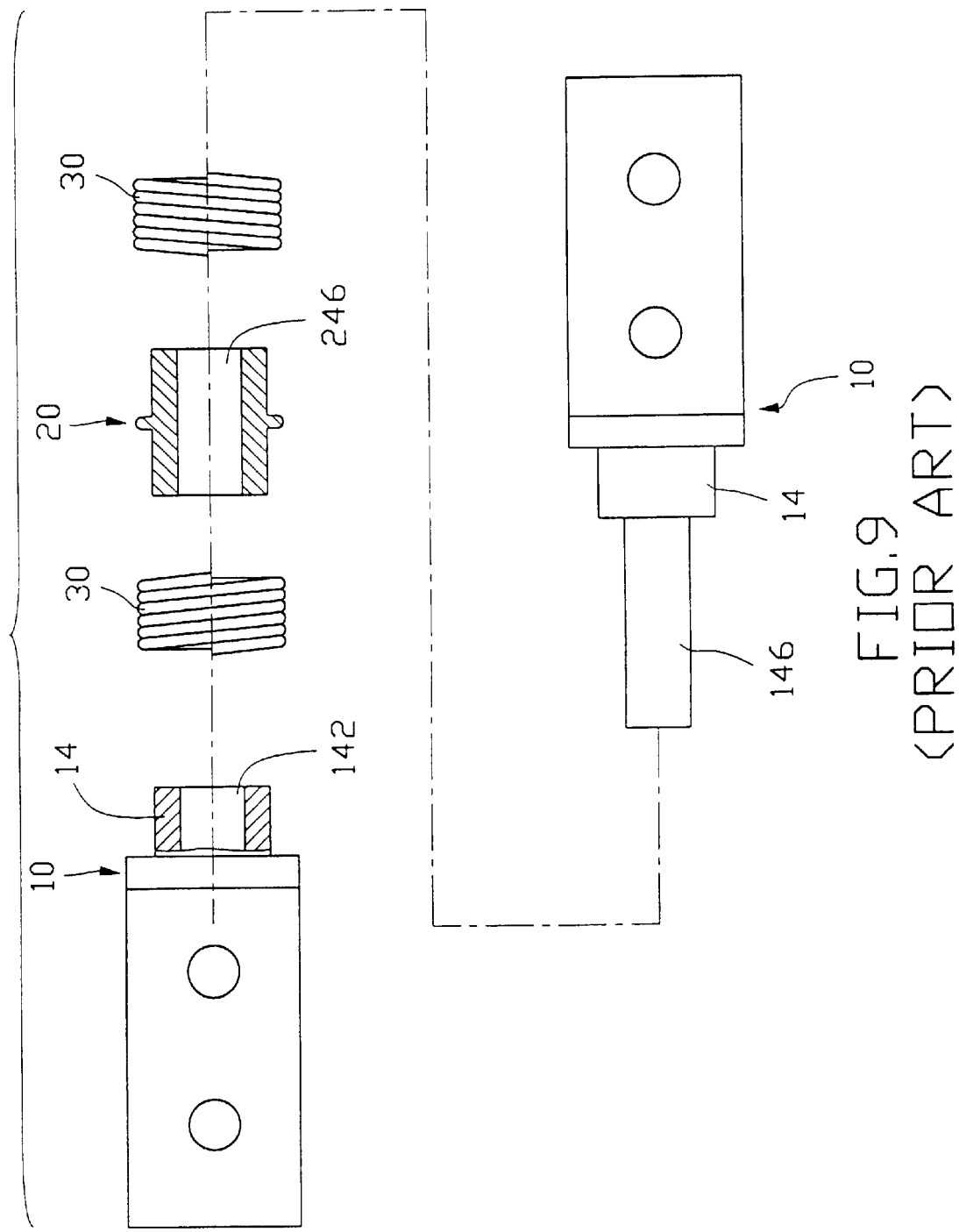
FIG. 9 is an exploded, partially cross-sectional view of a conventional hinge device.

A hinge device in accordance with a third embodiment of the present invention is shown in FIGS. 7 and 8. The hinge device is substantially identical to the first embodiment except for the following differences.

The cylindrical body 31" has front and rear splits 319, 319" in its periphery. Each split 319, 319" has a width which is relatively narrow compared to the separating slot 313. The second contacting section (not shown) is defined by the inner surface of the body 31" between the two splits 319, 319". The first contacting section 113" is formed in a middle of the pivoting rod 11". The body 31" connects with the second mounting plate 33" by a portion of the body 31" to the front of the front split 319 and by a portion to the rear of the rear split 319". In comparison with the previous two embodiments, this embodiment has the advantage that the body 31" connects to the second mounting plate 33" at two points; thus, a bending moment exerted on the cylindrical body 31" by the pivoting rod 11" can be more evenly distributed in the second mounting plate 33". In this embodiment, the sinuous grooves (not shown) for retaining lubrication grease are defined in the second contacting section (not shown) of the body 31".

Although two sinuous grooves are shown in the preferred embodiment of the present invention, it is to be understood that this number is adjustable according to the lubrication requirements of different applications.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge device comprising:

a male hinge member including a first mounting plate adapted to fix the male hinge member onto a display unit of a portable computer, and a pivoting rod extending opposite the first mounting plate and defining a first contacting section on an outer periphery thereof;

a female hinge member including a second mounting plate adapted to fix the female hinge member onto a mainframe unit of a portable computer and a cylindrical body defining a connecting opening for holding the pivoting rod of the male hinge member therein and a second contacting section in an inner periphery thereof for contacting the first contacting section of the male hinge member, a receiving slot being defined in the second mounting plate for spacing the second contacting section from the second mounting plate, thereby maintaining the same torque resistance between the first contacting section and the second contacting section during rotation movements in different directions; and means for providing a smooth rotation operation between the male and the female hinge members.

2. The hinge device as claimed in claim 1, wherein the means comprises at least a sinuous groove in the second contacting section for retaining lubrication grease therein.

3. The hinge device as claimed in claim 1, wherein the first contacting section of the male hinge member is defined at a rear portion of the pivoting rod, and the second contacting section is defined at a rear portion of the body of the female hinge member for cooperating with the first contacting section.

4. The hinge device as claimed in claim 3, wherein a separating slot is provided in the outer periphery of the body for defining the second contacting section.

5. The hinge device as claimed in claim 3, wherein a relatively narrow split is provided in the outer periphery of the body for defining the second contacting section.

6. The hinge device as claimed in claim 1, wherein the second contacting section is defined in a middle of the body between two splits provided in the outer periphery of the body for evenly distributing a bending moment exerted on the body by the pivoting rod to the second mounting plate, and wherein the first contacting section is defined on a middle of the pivoting rod.

7. The hinge device as claimed in claim 1, wherein a recess is transversely defined in an outside periphery of the first contacting section of the male hinge member for retaining lubrication grease.

8. The hinge device as claimed in claim 1, wherein the body of the female hinge member longitudinally defines a slit through a periphery thereof for enhancing the expansion force thereof.

9. The hinge device as claimed in claim 1, wherein a plurality of mounting holes are respectively defined in the male and the female hinge members for mounting the male and the female hinge members onto the portable computer.

10. A hinge device comprising:

a male hinge member including a pivoting rod at one end thereof, the pivoting rod defining a first contacting section on an outer periphery thereof;

a female hinge member including a cylindrical body defining a connecting opening for holding the pivoting rod of the male hinge member therein, the body defining a second contacting section in an inner periphery thereof for contacting the first contacting section of the male hinge member, and at least a sinuous groove in the second contacting section for retaining lubrication grease thereby providing a smooth rotation operation between the male and the female hinge members.

11. A female hinge member for use with a male hinge member, comprising:

a mounting plate including a plurality of mounting holes therein;

a tubular body integrally formed with the mounting plate;

a slit formed in the tubular body adjacent to the mounting plate and extending through the tubular body in an axial direction thereof; and a separating slot formed in the tubular body and extending along a transverse direction perpendicular to said axial direction; and a receiving slot formed in the mounting plate along the axial direction, one end of said receiving slot terminating around a distal end of the body, and the other end terminating around said separating slot so as to form a receiving portion of the body which is defined between said distal end and said separating slot, and is generally separate from the mounting plate.

12. The female hinge member as defined in claim 11, wherein the tubular body is formed by a forming procedure.

* * * * *